United States Patent
Sakai et al.

(10) Patent No.: US 9,755,240 B2
(45) Date of Patent: Sep. 5, 2017

(54) ELECTRODE FOR SODIUM MOLTEN-SALT BATTERY AND SODIUM MOLTEN-SALT BATTERY

(71) Applicant: Sumitomo Electric Industries, Ltd., Osaka-shi (JP)

(72) Inventors: Shoichiro Sakai, Osaka (JP); Koma Numata, Osaka (JP); Eiko Imazaki, Osaka (JP); Atsushi Fukunaga, Osaka (JP); Koji Nitta, Osaka (JP); Shinji Inazawa, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 147 days.

(21) Appl. No.: 14/765,164

(22) PCT Filed: Dec. 17, 2013

(86) PCT No.: PCT/JP2013/083763
§ 371 (c)(1),
(2) Date: Jul. 31, 2015

(87) PCT Pub. No.: WO2014/119157
PCT Pub. Date: Aug. 7, 2014

(65) Prior Publication Data
US 2015/0372308 A1    Dec. 24, 2015

(30) Foreign Application Priority Data

Feb. 4, 2013    (JP) ................. 2013-019350

(51) Int. Cl.
| | |
|---|---|
| *H01M 4/36* | (2006.01) |
| *H01M 4/48* | (2010.01) |
| *H01M 6/20* | (2006.01) |
| *H01M 4/62* | (2006.01) |
| *H01M 4/13* | (2010.01) |
| *H01M 10/39* | (2006.01) |
| *H02J 7/00* | (2006.01) |

(52) U.S. Cl.
CPC ............. *H01M 4/622* (2013.01); *H01M 4/13* (2013.01); *H01M 10/399* (2013.01); *H02J 7/007* (2013.01); *H01M 2300/0048* (2013.01)

(58) Field of Classification Search
CPC ........ H01M 4/13; H01M 4/622; H01M 10/39; H01M 10/3909; H01M 10/44; H01M 10/3918; H01M 4/623
See application file for complete search history.

(56) References Cited

U.S. PATENT DOCUMENTS

| | | | |
|---|---|---|---|
| 2009/0136851 A1* | 5/2009 | Choi ................... | H01M 4/134 429/231.95 |
| 2013/0059202 A1* | 3/2013 | Nishimura ........... | H01M 4/366 429/213 |

FOREIGN PATENT DOCUMENTS

| | | |
|---|---|---|
| CN | 87104494 A | 1/1988 |
| CN | 103931028 A | 7/2014 |
| CN | 104508894 A | 4/2015 |
| CN | 104620437 A | 5/2015 |
| JP | 2006-228515 A | 8/2006 |
| JP | 2007-529874 A | 10/2007 |
| JP | 2011-142016 A | 7/2011 |
| JP | 2012-195100 A | 10/2012 |
| JP | 2012-212648 A | 11/2012 |
| JP | 2013-004432 A | 1/2013 |
| WO | WO-2005/089391 A2 | 9/2005 |
| WO | 2012/059262 A1 | 5/2012 |

OTHER PUBLICATIONS

International Search Report for International Application No. PCT/JP2013/083763 dated Feb. 10, 2014.
Notification of First Office Action in counterpart Chinese Patent Application No. 201380072018.6, dated Sep. 5, 2016.

* cited by examiner

*Primary Examiner* — Patrick Ryan
*Assistant Examiner* — Julian Anthony
(74) *Attorney, Agent, or Firm* — Venable LLP; Michael A. Sartori; Miguel A. Lopez (57) ABSTRACT

Provided is an electrode for a sodium molten-salt battery in which degradation of the electrode can be suppressed even when charging and discharging are repeated, and which has excellent cycle characteristics. The electrode for a sodium molten-salt battery includes a current collector and an electrode mixture adhering to a surface of the current collector, in which the electrode mixture includes an electrode active material and a binder containing a polymer, and the polymer does not contain a fluorine atom. The polymer can include, for example, at least one selected from the group consisting of polyamide resins and polyimide resins or at least one selected from the group consisting of acrylic resins, rubber-like polymers, and cellulose derivatives.

2 Claims, 6 Drawing Sheets

ELECTRODE FOR SODIUM MOLTEN-SALT BATTERY AND SODIUM MOLTEN-SALT BATTERY

TECHNICAL FIELD

The present invention relates to a sodium molten-salt battery which contains an electrolyte having sodium ion conductivity and in particular, to an improvement of a binder used in an electrode for a sodium molten-salt battery.

BACKGROUND ART

In recent years, techniques for converting natural energy, such as sunlight or wind power, into electrical energy have been receiving attention. Furthermore, there has been an increased demand for non-aqueous electrolyte secondary batteries as batteries having a high energy density capable of storing a large amount of electrical energy. Among non-aqueous electrolyte secondary batteries, lithium ion secondary batteries are promising in terms of being light weight and having high electromotive force. However, lithium ion secondary batteries have a drawback in that they have low heat resistance because of the use of an organic solvent as the electrolyte component. Furthermore, with the growing market of non-aqueous electrolyte secondary batteries, the prices of lithium resources are rising.

Accordingly, development has been conducted on molten-salt batteries which use an incombustible molten salt as an electrolyte. Molten salts have excellent thermal stability, in which safety can be secured relatively easily, and are suitable for continuous use under high-temperature range conditions. Furthermore, since molten-salt batteries can use, as an electrolyte, a molten salt containing, as a cation, an inexpensive alkali metal other than lithium (in particular, sodium), the production costs thereof are low.

A molten-salt battery is a general term for any battery that contains a salt in a molten state (molten salt) as an electrolyte. The salt used as an electrolyte of the molten-salt battery is a liquid having ion conductivity (ionic liquid) at least in the molten state.

In a positive electrode of a sodium molten-salt battery, a sodium-containing transition metal oxide, such as sodium chromite, is used as a positive electrode active material. Furthermore, in a negative electrode, as a negative electrode active material, for example, sodium, a sodium alloy, a metal that alloys with sodium, a carbon material, a ceramic material, or the like is used. The positive electrode and the negative electrode can each be formed, for example, by using a mixture containing such an active material and a binder.

PTL 1 discloses that polyvinylidene fluoride (PVDF) is used as a binder of an electrode for a molten-salt battery.

Fluororesins, such as PVDF, have a high binding property and a good handling property, and therefore, are used as an electrode binder not only for a molten-salt battery, but also for an organic electrolyte secondary battery, such as a lithium ion secondary battery or sodium ion secondary battery (for example, refer to PTL 2).

CITATION LIST

Patent Literature

PTL 1: Japanese Unexamined Patent Application Publication No. 2013-004432

PTL 2: Japanese Unexamined Patent Application Publication No. 2012-212648

SUMMARY OF INVENTION

Technical Problem

Unlike the organic electrolyte solution used in an organic electrolyte secondary battery, such as a lithium ion secondary battery, the electrolyte of a molten-salt battery contains a large amount of alkali metal cations which act as ion carriers. Accordingly, in a molten-salt battery, in particular, side reactions involving alkali metal cations are likely to occur. Furthermore, in order to operate a molten-salt battery, it is necessary to keep the electrolyte in a molten state.

Therefore, in many cases, molten-salt batteries are operated at a temperature higher than normal temperature (e.g., 40° C. or higher), and may be operated at a temperature of 80° C. or higher (e.g., 80° C. to 90° C.) from the standpoint of securing high ion conductivity. Such an operating temperature is higher than that of organic electrolyte secondary batteries. At the temperature described above, the reactivity of alkali metal cations of the molten salt is likely to increase.

The present inventors have found that when an electrode binder containing a fluororesin, such as PVDF, is used in a molten-salt battery, side reactions are likely to occur in which, under the influence of alkali metal cations of the electrolyte and redox reactions in the electrode, fluorine atoms are taken away from the fluororesin, and the binder is degraded, resulting in a decreased binding property. The present inventors have also found that such fluorine atom abstraction reactions are noticeable in molten-salt batteries to an extent that cannot be anticipated in the case of organic electrolyte secondary batteries, and the binder is likely to be degraded. When the binding property of the binder is decreased by such reactions, with repeated charging and discharging, separation of the active material and separation of the mixture layer are likely to occur, which may result in degraded cycle characteristics.

Solution to Problem

In consideration of the above, an aspect of the present invention relates to an electrode for a sodium molten-salt battery including a current collector and an electrode mixture adhering to a surface of the current collector, in which the electrode mixture includes an electrode active material and a binder containing a polymer, and the polymer does not contain a fluorine atom. In such an electrode, since the polymer of the binder does not contain a fluorine atom, it is possible to suppress degradation of the binder due to fluorine atom abstraction from the polymer. Consequently, degradation of the electrode can be suppressed when charging and discharging are repeated, and therefore, it is possible to suppress degradation in cycle characteristics.

The polymer may include at least one selected from the group consisting of an amide bond and an imide bond. Such a polymer can include at least one selected from the group consisting of polyamide resins and polyimide resins. By using such a polymer for the binder, degradation of the binder can be more effectively suppressed, thus being more effective in suppressing degradation in cycle characteristics.

Furthermore, the polymer may include at least one selected from the group consisting of acrylic resins, rubber-like polymers, and cellulose derivatives. When such a polymer is used, it is also possible to more effectively suppress degradation of the binder, and degradation in cycle characteristics can be effectively suppressed.

The weight-average molecular weight of the polymer is preferably 10,000 to 500,000. Furthermore, in the case where the polymer includes a polyamide-imide resin, the weight-average molecular weight of the polyamide-imide resin is preferably 50,000 to 200,000. By using a polymer with such a molecular weight, degradation of the binder can be further suppressed.

The amount of the binder is preferably 2 to 7 parts by mass relative to 100 parts by mass of the electrode active material. When the amount of the binder is in such a range, while suppressing degradation of the electrode, it is possible to more effectively suppress a decrease in the capacity of the battery and/or the electrical conductivity of the electrode.

In a preferred embodiment, the electrode described above is used as a negative electrode. The fluorine atom abstraction reactions in the sodium molten-salt battery are likely to become marked particularly on the negative electrode side. Therefore, by using the binder described above for the negative electrode, the effect of suppressing degradation of the binder can be more effectively exhibited. Furthermore, from the viewpoint of thermal stability, electrochemical stability, and the like, the electrode active material may be at least one selected from the group consisting of sodium-containing titanium compounds and carbonaceous materials.

Another aspect of the present invention relates to a sodium molten-salt battery including a positive electrode, a negative electrode, a separator interposed between the positive electrode and the negative electrode, and an electrolyte which has sodium ion conductivity at least at the time of being molten, in which the electrolyte contains at least a salt of an anion including a bis(sulfonyl)imide anion and a sodium ion, the negative electrode includes a negative electrode current collector and a negative electrode mixture adhering to a surface of the negative electrode current collector, the negative electrode mixture includes a negative electrode active material and a binder containing a polymer, and the polymer does not contain a fluorine atom. In such a sodium molten-salt battery, in spite of the presence of a large amount of sodium ions in the electrolyte, it is possible to suppress degradation of the binder due to side reactions of the binder. Consequently, degradation of the electrode due to repeated charging and discharging can be suppressed, and therefore, it is possible to suppress degradation in cycle characteristics.

Another aspect of the present invention relates to a charging and discharging method for a sodium molten-salt battery, in which the sodium molten-salt battery includes a positive electrode, a negative electrode, a separator interposed between the positive electrode and the negative electrode, and an electrolyte which has sodium ion conductivity at least at the time of being molten, the electrolyte contains at least a salt of an anion including a bis(sulfonyl)imide anion and a sodium ion, the negative electrode includes a negative electrode current collector and a negative electrode mixture adhering to a surface of the negative electrode current collector, the negative electrode mixture includes a negative electrode active material and a binder containing a polymer, and the polymer does not contain a fluorine atom, the charging and discharging method including a step of charging and discharging the sodium molten-salt battery in the state of being heated in a temperature range of 40° C. to 190° C. In such a charging and discharging method, despite performing charging and discharging at a temperature of 40° C. to 190° C., it is possible to suppress degradation of the binder due to side reactions of the binder, and therefore, degradation of cycle characteristics can be suppressed.

Advantageous Effects of Invention

According to the present invention, it is possible to suppress degradation of the binder due to side reactions between sodium ions and the binder. Since degradation of the binder is suppressed, degradation of the electrode can be suppressed when charging and discharging are repeated. Therefore, it is possible to obtain a sodium molten-salt battery having excellent cycle characteristics.

DESCRIPTION OF EMBODIMENTS (Electrode)

An electrode for a sodium molten-salt battery includes a current collector and an electrode mixture adhering to a surface of the current collector, and the electrode mixture includes an electrode active material and a binder containing a polymer.

The term "sodium molten-salt battery" refers to a battery which includes, as an electrolyte, a molten salt containing at least sodium ions, and the sodium ions act as charge carriers involved in charge/discharge reactions. In the sodium molten-salt battery, the molten salt serving as an electrolyte melts at a temperature equal to or higher than the melting point to become an ionic liquid, and has sodium ion conductivity at least at the time of being molten.

In existing electrodes for a sodium molten-salt battery, a fluororesin, such as PVDF, is used as a binder in some cases. However, it has been found that when a fluororesin is used as a binder for an electrode, fluorine atom abstraction reactions occur, and the binder is likely to degrade.

The present inventors have noticed that side reactions associated with fluorine atom abstraction are more likely to occur in sodium molten-salt batteries than in organic electrolyte secondary batteries, such as lithium ion secondary batteries. Although the reason for this is not clear, it is assumed that there is a possibility that, in addition to the influence of sodium ions in the electrolyte, redox reactions in the electrode and precipitation of metallic sodium may influence the abstraction reactions. Furthermore, while organic electrolyte secondary batteries are assumed to be operated mainly at normal temperature, sodium molten-salt batteries are, in general, assumed to be operated at a temperature higher than normal temperature (e.g., 40° C. or higher and equal to or lower than the decomposition temperature of the electrolyte), and in some cases, may be operated at 80° C. to 90° C., which is close to the melting point of sodium. It is believed that such a difference in operating temperature also influences the fluorine atom abstraction.

Moreover, the melting point of sodium (98° C.) is much lower than the melting point of lithium (181° C.), and is close to the operating temperature of molten-salt batteries. Metallic sodium in the molten state is more active than metallic sodium in the solid state and therefore has high reactivity. Accordingly, in the case where metallic sodium is precipitated on electrodes, it is believed that, when a molten-salt battery is operated in a temperature range exceeding the normal temperature, for example, at an operating temperature of 40° C. or higher, abstraction of fluorine atoms from the binder is more likely to occur.

In the present invention, in an electrode for a sodium molten-salt battery, a binder containing a polymer which does not contain a fluorine atom is used. Accordingly, degradation of the binder is suppressed, and degradation of the electrode can be suppressed when charging and discharging are repeated. Therefore, it is possible to obtain a sodium molten-salt battery having excellent cycle characteristics. In the present invention, in particular, even in the case where a sodium molten-salt battery is operated in the state of being heated in a temperature range of 40° C. to 190° C. (i.e., charging and discharging of the sodium molten-salt battery are performed), it is possible to achieve excellent cycle characteristics.

Although not so marked as in the case of fluorine atoms, when the polymer of the binder contains a halogen atom other than a fluorine atom, such as a chlorine atom, halogen atom abstraction may sometimes occur.

Therefore, preferably, the polymer does not contain a halogen atom. Thereby, it is possible to more effectively suppress degradation of the binder due to side reactions between sodium ions and the binder.

Examples of the halogen atom include a fluorine atom, a chlorine atom, a bromine atom, an iodine atom, and an astatine atom. Preferably, the polymer of the binder does not contain a fluorine atom and a halogen atom other than the fluorine atom (at least one element selected from the group consisting of chlorine, bromine, iodine, and astatine). In view of abstraction and the like, among halogen atoms other than the fluorine atom, preferably, the polymer of the binder does not contain chlorine and/or bromine.

The fluorine atom (or halogen atom) contained in the polymer may be either a fluorine atom (or halogen atom) contained in the side chain of the polymer or a fluorine atom (or halogen atom) contained in the main chain of the polymer. Although depending on the type of polymer, when the fluorine atom (or halogen atom) contained in the main chain of the polymer is taken away, the properties of the polymer are likely to change greatly. Therefore, in particular, preferably, the polymer does not contain a fluorine atom (or halogen atom) in the main chain thereof. Note that the fluorine atom (or halogen atom) contained in the main chain of the polymer means the fluorine atom (or halogen atom) directly bonded to the main chain of the polymer.

Although the binder may contain, as necessary, a component other than the polymer, the binder can be mostly composed of the polymer. The content of the polymer in the binder is, for example, 90% to 100% by mass, preferably 95% to 100% by mass, and more preferably 98% to 100% by mass. The binder may contain the polymer only.

The polymer should be a compound having a certain molecular weight, and is not limited to a so-called synthetic polymer, but may be a naturally occurring polymer or a treated product thereof. Examples of the naturally occurring polymer or a treated product thereof include polysaccharides, such as cellulose derivatives (cellulose ethers, cellulose esters, and the like). Examples of the synthetic polymer include thermoplastic resins, thermosetting resins, and the like.

The polymers may be used alone or in combination of two or more.

Specific examples of the polymer include a polymer containing an amide bond and/or an imide bond, an acrylic resin, a polyolefin resin, a vinyl resin, a vinyl cyanide resin, a polyphenylene oxide resin, a polyphenylene sulfide resin, a rubber-like polymer, and the like. From the standpoint of the binding property, stability in the battery, heat resistance, or the like, a polymer containing an amide bond and/or an imide bond, an acrylic resin, a rubber-like polymer, and the like are preferable.

As the polymer containing an amide bond and/or an imide bond, specifically, a resin having a repeating unit containing an amide bond and/or an imide bond may be exemplified. Specific examples of such a polymer include polyamide resins (aromatic polyamides, wholly aromatic polyamides such as aramid resins, and the like) and polyimide resins. Examples of the polyimide resins include thermosetting polyimides, such as condensation polyimides and addition polyimides; and thermoplastic polyimides. Examples of the thermoplastic polyimides include thermoplastic polyimides in which benzophenone tetracarboxylic acid, diaminodiphenylmethane, and the like are used as monomers; a polyetherimide resin; a polyesterimide resin; a polyamide-imide resin; and the like. Among these, from the viewpoint of the handling property of the mixture, heat resistance, and the like, a polyamide-imide resin is preferable.

Examples of the acrylic resin include homopolymers or copolymers having a (meth)acrylic unit, such as (meth)acrylic acid or a (meth)acrylic ester (e.g., methyl(meth)acrylate)). Note that acrylic acid and methacrylic acid are collectively referred to as "(meth)acrylic acid".

As the acrylic resin, a homopolymer, such as polyacrylic acid, an acrylic acid-methacrylic acid copolymer, and the like are preferable.

Examples of the rubber-like polymer include styrene-butadiene rubber (SBR), styrene-isoprene rubber, acrylonitrile butadiene rubber, acrylic rubber, and the like. A diene-based rubber-like polymer, such as SBR, is preferable.

Among the polymers, examples of the cellulose derivative include cellulose ethers, such as a carboxyalkyl cellulose, e.g., carboxymethyl cellulose (CMC), or a salt thereof (e.g., an alkyl metal salt such as a sodium salt of CMC), and a hydroxyalkyl cellulose, e.g., hydroxyethyl cellulose; and cellulose esters, such as acetylcellulose. As the cellulose derivative, a cellulose ether, such as CMC or a sodium salt of CMC, is preferable.

The polymer contained in the binder preferably includes at least one selected from the group consisting of an amide bond and an imide bond. Furthermore, a polymer including at least one selected from the group consisting of acrylic resins, rubber-like polymers, and cellulose derivatives is also suitable for the binder.

Although depending on the type of polymer, the weight-average molecular weight of the polymer is, for example, 10,000 or more, preferably 20,000 or more, and more preferably 50,000 or more or 80,000 or more. The weight-average molecular weight of the polymer is, for example, 500,000 or less, preferably 200,000 or less, and more preferably 150,000 or less or 100,000 or less. These lower limits and upper limits can be appropriately selected and combined. The weight-average molecular weight of the polymer may be, for example, 10,000 to 500,000, or 50,000 to 200,000. When the weight-average molecular weight of the polymer is in such a range, it is possible to suppress a decrease in the dispersibility of the polymer in the electrode mixture, and a high binding property is likely to be obtained.

For example, the weight-average molecular weight of a resin having a repeating unit containing an amide bond and/or an imide bond or a cellulose derivative may be, for example, 50,000 to 200,000, preferably 80,000 to 150,000. The weight-average molecular weight of an acrylic resin may be, for example, 10,000 to 150,000, preferably 20,000 to 100,000.

The amount of the binder is, for example, 1 to 10 parts by mass, preferably 2 to 7 parts by mass, and more preferably 2.5 to 5 parts by mass, relative to 100 parts by mass of the electrode active material. When the amount of the binder is in such a range, it is possible to more effectively secure the capacity of the battery and/or the electrical conductivity of the electrode, and a high binding property. Therefore, it is possible to more effectively suppress degradation of the electrode, and it is possible to effectively suppress a decrease in the capacity of the battery and/or the electrical conductivity of the electrode.

The electrode of the present invention can be used as a positive electrode and/or a negative electrode of a sodium molten-salt battery. In the case where the electrode of the present invention is used as only one of the positive electrode and the negative electrode, an existing electrode can be used as the other electrode.

At a negative electrode potential, reductive decomposition is likely to occur, and fluorine atom abstraction is also likely to become marked. When a fluorine atom-containing polymer is used for a binder, the binder is likely to degrade, in particular, on the negative electrode side. In the present invention, since the binder described above is used, it is particularly effective to suppress degradation of the negative electrode. Accordingly, it is preferable to use the electrode at least for the negative electrode of a sodium molten-salt battery, and the electrode may be used for each of the negative electrode and the positive electrode.

Among the electrode active materials, the negative electrode active material used for the negative electrode is a material which can dissolve out sodium ions, precipitate sodium, occlude and release sodium ions, and alloy with and dealloy from sodium, at a baser potential than that of the positive electrode active material.

Specific examples of the negative electrode active material include elementary substances, alloys, or compounds of tin, silicon, and the like; metal compounds containing sodium, titanium, zinc, indium, and the like; tin compounds, silicon compounds; and carbonaceous materials. The alloys may contain, in addition to tin and/or silicon, another alkali metal and/or alkaline-earth metal and the like. Examples of the metal compounds include sodium-containing titanium compounds. Examples of the carbonaceous materials include graphitizable carbon (soft carbon) and non-graphitizable carbon (hard carbon). The negative electrode active materials may be used alone or in combination of two or more.

From the viewpoint of thermal stability, electrochemical stability, and the like, the negative electrode active material is preferably at least one selected from the group consisting of metal compounds (sodium-containing titanium compounds and the like) and carbonaceous materials. Among the carbonaceous materials, in particular, use of hard carbon is preferable.

As the sodium-containing titanium compound, sodium titanate is preferable. More specifically, use of at least one selected from the group consisting of $Na_2Ti_3O_7$ and $Na_4Ti_5O_{12}$ is preferable. Furthermore, part of Ti or Na of sodium titanate may be replaced with another element. For example, it is possible to use $Na_{2-x1}M^1_{x1}Ti_{3-y1}M^2_{y1}O_7$ (where $0 \leq x1 \leq 3/2$; $0 \leq y1 \leq 8/3$; and $M^1$ and $M^2$ are each independently a metal element other than Ti and Na, and for example, at least one selected from the group consisting of Ni, Co, Mn, Fe, Al, and Cr), $Na_{4-x2}M^3_{x2}Ti_{5-y2}M^4_{y2}O_{12}$ (where $0 \leq x2 \leq 11/3$; $0 \leq y2 \leq 14/3$; and $M^3$ and $M^4$ are each independently a metal element other than Ti and Na, and for example, at least one selected from the group consisting of Ni, Co, Mn, Fe, Al, and Cr), and the like. The sodium-containing titanium compounds may be used alone or in combination of two or more. The sodium-containing titanium compound may be used in combination with hard carbon. Note that $M^1$ and $M^3$ each represent an element occupying the Na site, and $M^2$ and $M^4$ each represent an element occupying the Ti site.

Hard carbon is a carbon material in which a graphite structure is not developed even when heated in an inert atmosphere, and in which minute graphite crystals are randomly arranged, and there are nanometer-order spaces between crystal layers. Since the sodium ion diameter is 0.95 A, the size of the spaces is preferably sufficiently larger than this value. The average interlayer distance of crystal layers is not particularly limited, and for example, is more than 0.37 nm, and preferably 0.38 nm or more.

The average particle size (particle size at which the cumulative value of volume particle size distribution is 50%) of hard carbon is, for example, 3 to 20 µm, and preferably 5 to 15 µm, from the standpoint of enhancing the filling property of the negative electrode active material in the negative electrode and suppressing side reactions with the electrolyte. Furthermore, the specific surface of hard carbon is, for example, 1 to 10 $m^2/g$, and preferably 3 to 8 $m^2/g$, from the standpoint of ensuring the acceptability of sodium ions and suppressing side reactions with the electrolyte. The hard carbons may be used alone or in combination of two or more.

Among the electrode active materials, the positive electrode active material used for the positive electrode is not particularly limited as long as it is a compound that can reversibly contain sodium ions. Examples thereof include sulfides, oxides, inorganic acid salts, and halides. As the positive electrode active material, from the viewpoint of thermal stability and electrochemical stability, a sodium-containing transition metal compound is preferably used.

The sodium-containing transition metal compound used as the positive electrode active material is preferably a compound having a layered structure in which sodium can enter and leave between layers, but is not particularly limited thereto.

Among the sodium-containing transition metal compounds, examples of the sulfides include $TiS_2$, $FeS_2$, and $NaTiS_2$. Examples of the oxides include $NaCrO_2$, $NaNi_{0.5}Mn_{0.5}O_2$, $NaMn_{1.5}Ni_{0.5}O_4$, $NaFeO_2$, $NaFe_{x3}(Ni_{0.5}Mn_{0.5})_{1-x3}O_2$ ($0<x3<1$), $Na_{2/3}Fe_{1/3}Mn_{2/3}O_2$, $NaMnO_2$, $NaNiO_2$, $NaCoO_2$, and $Na_{0.44}MnO_2$. Examples of the inorganic acid salts include sodium transition metal oxysalts, such as sodium transition metal silicates ($Na_6Fe_2Si_{12}O_{30}$, $Na_2Fe_5Si_{12}O_{30}$, $Na_2Fe_2Si_6O_{18}$, $Na_2MnFeSi_6O_{18}$, $Na_2MnFeSi_6O_{18}$, $Na_2FeSiO_6$, and the like), sodium transition metal phosphates, sodium transition metal fluorophosphates ($Na_2FePO_4F$, $NaVPO_4F$, and the like), and sodium transition metal borates ($NaFeBO_4$, $Na_3Fe_2(BO_4)_3$, and the like). Examples of the sodium transition metal phosphates include $NaFePO_4$, $NaM^5PO_4$, $Na_3Fe_2(PO_4)_3$, $Na_2FeP_2O_7$, and $Na_4M^5{}_3(PO_4)_2P_2O_7$. Note that $M^5$ represents at least one selected from the group consisting of Ni, Co, and Mn. Examples of the halides include sodium transition metal fluorides, such as $Na_3FeF_6$, $NaMnF_3$, and $Na_2MnF_6$.

The positive electrode active materials can be used alone or in combination of two or more. Among the sodium transition metal compounds, at least one selected from the group consisting of sodium chromite ($NaCrO_2$) and sodium ferromanganate ($Na_{2/3}Fe_{1/3}Mn_{2/3}O_2$ or the like) is preferable.

Furthermore, part of Cr or Na of sodium chromite may be replaced with another element, and part of Fe, Mn, or Na of sodium ferromanganate may be replaced with another element. For example, it is possible to use $Na_{1-x4}M^6{}_{x4}Cr_{1-y3}M^7{}_{y3}O_2$ (where $0 \leq x4 \leq 2/3$; $0 \leq y3 \leq 2/3$; and $M^6$ and $M^7$ are each independently a metal element other than Cr and Na, and for example, at least one selected from the group consisting of Ni, Co, Mn, Fe, and Al), $Na_{2/3-x5}M^8{}_{x5}Fe_{1/3-y4}Mn_{2/3-z1}M^9{}_{y4+z1}O_2$ (where $0 \leq x5 \leq 1/3$; $0 \leq y4 \leq 1/3$; $0 \leq z1 \leq 1/3$; and $M^8$ and $M^9$ are each independently a metal element other than Fe, Mn, and Na, and for example, at least one selected from the group consisting of Ni, Co, Al, and Cr), and the like. Note that $M^6$ and $M^8$ each represent an element occupying the Na site, $M^7$ represents an element occupying the Cr site, and $M^9$ represents an element occupying the Fe or Mn site.

The positive electrode active materials may be used alone or in combination of two or more.

The electrode mixture may further include, as necessary, a conducting agent. Examples of the conducting agent include carbonaceous conducting agents, such as graphite, carbon black, and carbon fibers. Among these, carbon black is particularly preferable from the viewpoint that a sufficient conduction path can be easily formed by use of a small amount.

The amount of the conducting agent is preferably 5 to 15 parts by mass, more preferably 5 to 10 parts by mass, relative to 100 parts by mass of the electrode active material.

It is preferable to add a conducting agent to a positive electrode mixture and a negative electrode mixture in which a metal compound, such as a sodium-containing titanium compound, is used as a negative electrode active material in order to secure sufficient electrical conductivity in the electrode.

In the case of a negative electrode mixture in which an alloy, hard carbon, or the like is used as a negative electrode active material, a conducting agent may be added thereto. However, in such a negative electrode mixture, since relatively high electrical conductivity is likely to be obtained by the negative electrode active material, sufficient electrical conductivity can be obtained without particularly using a conducting agent.

As the current collector, a metal foil, a non-woven fabric made of metal fibers, a porous metal sheet, or the like is used.

As the metal constituting the positive electrode current collector, aluminum or an aluminum alloy is preferable because it is stable at the positive electrode potential, but the metal is not particularly limited thereto. As the metal constituting the negative electrode current collector, copper, a copper alloy, nickel, a nickel alloy, aluminum, an aluminum alloy, or the like is preferable because it does not alloy with sodium and is stable at the negative electrode potential, but the metal is not particularly limited thereto.

The thickness of a metal foil serving as the current collector is, for example, 10 to 50 µm, and the thickness of a non-woven fabric of metal fibers or a porous metal sheet is, for example, 100 to 600 µm.

The electrode of the present invention is formed by making an electrode mixture including, as essential components, an electrode active material and a binder to adhere to the surface of a current collector. More specifically, the electrode is formed by applying an electrode mixture paste, in which the electrode active material, the binder and, as necessary, a conducting agent are dispersed in a dispersion medium, onto the surface of the current collector, followed by drying and, as necessary, rolling. Thereby, the electrode mixture is immobilized (or carried) on the surface of the current collector.

Examples of the dispersion medium include organic media, such as ketones, e.g., acetone, ethers, e.g., tetrahydrofuran, nitriles, e.g., acetonitrile, amides, e.g., dimethylacetamide, N-methyl-2-pyrrolidone (NMP), alcohols, e.g., ethanol; and water and others. These dispersion media may be used alone or in combination of two or more.

The dispersion medium can be appropriately selected depending on the type of the binder and/or the active material. For example, in the case where a resin having a repeating unit containing an amide bond and/or an imide bond is used for the binder, an organic medium can be used. Furthermore, in the case where an acrylic resin (such as polyacrylic acid), a rubber-like polymer, a cellulose derivative (such as CMC or a Na salt of CMC), or the like is used for the binder, water, a mixture of water and a water-soluble organic medium, or the like can be used.

Figure 1:
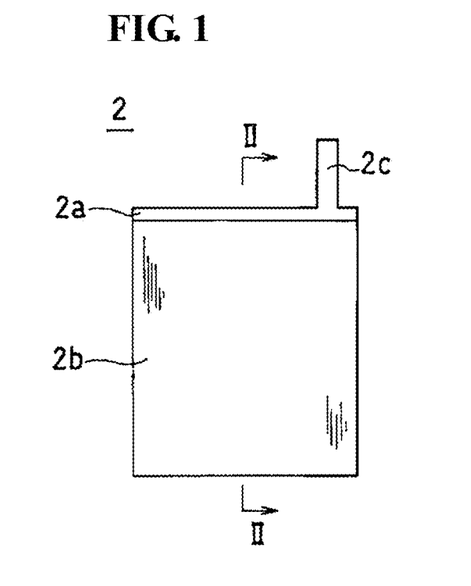
FIG. 1 is a front elevational view of a positive electrode according to an embodiment of the present invention.
Figure 2:
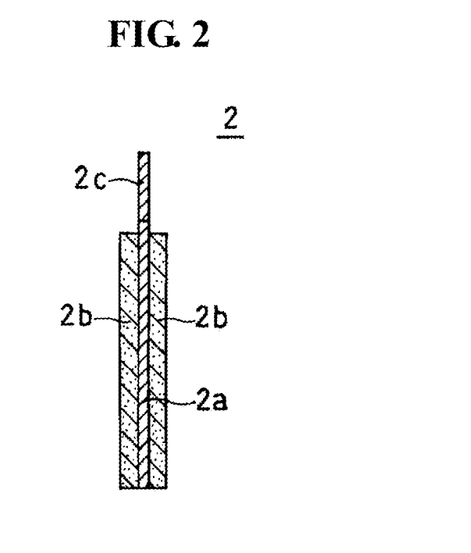
FIG. 2 is a cross-sectional view taken along the line II-II of FIG. 1.

FIG. 1 is a front elevational view of a positive electrode according to an embodiment of the present invention, and FIG. 2 is a cross-sectional view taken along the line II-II of FIG. 1.

A positive electrode 2 includes a positive electrode current collector 2a and a positive electrode mixture 2b immobilized on the positive electrode current collector 2a.

The positive electrode mixture 2b contains, for example, a positive electrode active material, a binder, and a conducting agent. A lead piece 2c for current collection may be provided on the positive electrode current collector 2a. The lead piece 2c may be integrally formed with the positive electrode current collector as shown in FIG. 1. Alternatively, a lead piece separately formed may be joined, by welding or the like, to the positive electrode current collector.

Figure 3:
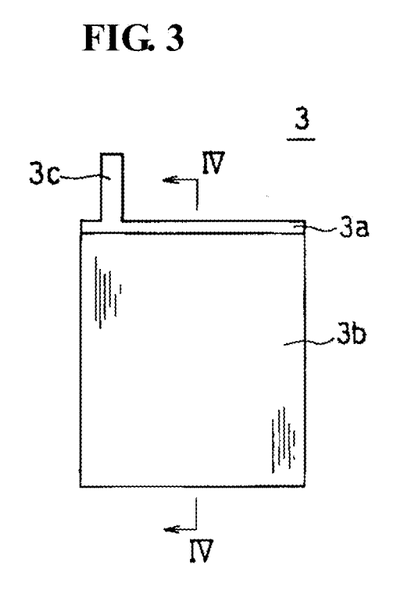
FIG. 3 is a front elevational view of a negative electrode according to an embodiment of the present invention.
Figure 4:
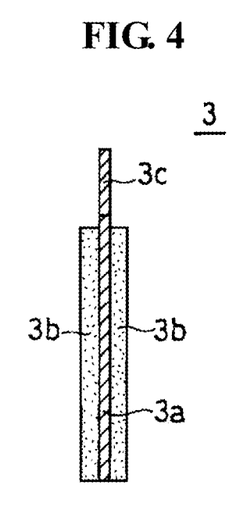
FIG. 4 is a cross-sectional view taken along the line IV-IV of FIG. 3.

FIG. 3 is a front elevational view of a negative electrode according to an embodiment of the present invention, and FIG. 4 is a cross-sectional view taken along the line IV-IV of FIG. 3.

A negative electrode 3 includes a negative electrode current collector 3a and a negative electrode mixture 3b immobilized on the negative electrode current collector 3a.

The negative electrode mixture 3b contains, for example, a negative electrode active material and a binder, and contains, as optional components, a conducting agent and the like. A lead piece 3c for current collection may be provided on the negative electrode current collector 3a. The lead piece 3c may be integrally formed with the negative electrode current collector as shown in FIG. 3. Alternatively, a lead piece separately formed may be joined, by welding or the like, to the negative electrode current collector.

(Sodium Molten-Salt Battery)

A sodium molten-salt battery includes a positive electrode, a negative electrode, a separator interposed between the positive electrode and the negative electrode, and an electrolyte which has sodium ion conductivity at least at the time of being molten.

As described above, preferably, the electrode described above is used at least for the negative electrode. That is, preferably, the polymer of the binder contained in the negative electrode mixture does not contain a fluorine atom.

The positive electrode may be the electrode containing the positive electrode active material described above or an existing positive electrode.

(Separator)

The separator plays a role of preventing internal short-circuits by physically isolating the positive electrode and the negative electrode from each other.

The separator is composed of a porous material, whose voids are impregnated with an electrolyte, and has sodium ion permeability in order to secure the battery reaction.

As the separator, for example, in addition to a microporous membrane made of a resin, a non-woven fabric or the like can be used. The separator may be formed of a microporous membrane or a non-woven fabric layer only, or formed of a laminated body including a plurality of layers having different compositions or different shapes. Examples of the laminated body include a laminated body including a plurality of resin porous layers having different compositions and a laminated body including a microporous membrane layer and a non-woven fabric layer.

The material for the separator can be selected in consideration of the operating temperature of the battery. Examples of the resin contained in the microporous membrane or fibers constituting the non-woven fabric include polyolefin resins, such as polyethylene, polypropylene, and ethylene-propylene copolymers; polyphenylene sulfide resins, such as polyphenylene sulfide and polyphenylene sulfide ketone; polyamide resins, such as aromatic polyamide resins (aramid resins, and the like); and polyimide resins. These resins may be used alone or in combination of two or more. Furthermore, the fibers constituting the non-woven fabric may be inorganic fibers, such as glass fibers. Preferably, the separator is composed of at least one selected from the group consisting of glass fibers, polyolefin resins, polyamide resins, and polyphenylene sulfide resins.

The separator may contain an inorganic filler. Examples of the inorganic filler include ceramics, such as silica, alumina, zeolite, and titania; talc, mica, wollastonite, and the like. The inorganic filler is preferably particulate or fibrous. The content of the inorganic filler in the separator is, for example, 10% to 90% by mass, and preferably 20% to 80% by mass.

The thickness of the separator is not particularly limited, and, for example, can be selected from a range of about 10 to 300 μm. In the case where the separator is formed of a microporous membrane, the thickness of the separator is preferably 10 to 100 μm, and more preferably 20 to 50 μm. Furthermore, in the case where the separator is formed of a non-woven fabric, the thickness of the separator is preferably 50 to 300 μm, and more preferably 100 to 250 μm.

(Electrolyte)

The electrolyte needs to have sodium ion conductivity at least at the time of being molten. Therefore, the electrolyte contains at least a salt (first salt) which contains, as a cation, a sodium ion that serves as a charge carrier in the molten-salt battery.

As such a first salt, for example, a salt of an anion including a bis(sulfonyl)imide anion and a sodium ion can be used. Note that the first salt may contain, as the cation, a sodium ion only, or may be a double salt which contains a sodium ion and another cation.

In the case where the electrolyte contains at least a salt of an anion including a bis(sulfonyl)imide anion and a sodium ion, a large amount of sodium ions are included in the electrolyte of the sodium molten-salt battery at the operating temperature of the battery. In such a battery, if the polymer included in the binder of the electrode contains fluorine atoms, fluorine atom abstraction is likely to become marked. In the present invention, even in such a battery, it is possible to suppress degradation of the binder due to side reactions of the binder.

As the bis(sulfonyl)imide anion, an anion having a structure with a bis(sulfonyl)imide skeleton, in which the sulfonyl group has a fluorine atom, can be exemplified. Examples of the sulfonyl group having a fluorine atom include a fluorosulfonyl group and a fluoroalkyl group-containing sulfonyl group. In the fluoroalkyl group, part of hydrogen atoms in the alkyl group may be replaced with fluorine atoms, or the fluoroalkyl group may be a perfluoroalkyl group in which all hydrogen atoms are replaced with fluorine atoms. As the fluorine atom-containing sulfonyl group, a fluorosulfonyl group or a perfluoroalkyl sulfonyl group is preferable.

A specific example of such a bis(sulfonyl)imide anion is an anion represented by the formula (1) below:

[Chem. 1]

(where $X^1$ and $X^2$ are each independently a fluorine atom or a perfluoroalkyl group having 1 to 8 carbon atoms).

Examples of the perfluoroalkyl group represented by each of $X^1$ and $X^2$ include a trifluoromethyl group, a pentafluoroethyl group, and a heptafluoropropyl group. From the standpoint of decreasing the viscosity of the ionic liquid, preferably, at least one of $X^1$ and $X^2$ is a perfluoroalkyl group, and more preferably, $X^1$ and $X^2$ are each a perfluoroalkyl group. Furthermore, from the standpoint of decreasing the viscosity of the ionic liquid, the number of carbon atoms in the perfluoroalkyl group is preferably 1 to 3, and more preferably 1 or 2.

Specific examples of the bis(sulfonyl)imide anion include a bis(fluorosulfonyl)imide anion (FSI$^-$); and a bis(perfluoroalkyl sulfonyl)imide anion (PFSI$^-$), such as a bis(trifluoromethyl sulfonyl)imide anion (TFSI$^-$), a bis(pentafluoroethyl sulfonyl)imide anion, or a fluorosulfonyl (trifluoromethyl sulfonyl)imide anion (($FSO_2$)($CF_3SO_2$)N$^-$).

As the first salt, a salt of a sodium ion and FSI$^-$(NaFSI), a salt of a sodium ion and PFSI$^-$(NaPFSI), such as sodium bis(trifluoromethyl sulfonyl)imide (NaTFSI), or the like is preferable.

The electrolyte melts at a temperature equal to or higher than the melting point to become an ionic liquid and exhibits sodium ion conductivity, and thus, the molten-salt battery can be operated. In consideration of costs and usage environment, from the standpoint of operating the battery at an appropriate temperature, the melting point of the electrolyte is preferably as low as possible. In order to decrease the melting point of the electrolyte, it is preferable to use a mixture of two or more salts as an electrolyte.

Specifically, the electrolyte preferably contains, in addition to the first salt, a salt (second salt) of an anion containing a bis(sulfonyl)imide anion and a cation other than the sodium ion. Examples of the bis(sulfonyl)imide anion constituting the second salt include the same as those exemplified for the first salt.

Examples of the other cation include inorganic cations [metal cations, e.g., alkali metal cations other than the sodium ion (a lithium ion, a potassium ion, a rubidium ion, a cesium ion, and the like), alkaline-earth metal cations (a magnesium ion, a calcium ion, and the like), and transition metal cations; an ammonium cation and the like]; and organic cations.

The other cations may be used alone or in combination of two or more.

Examples of the organic cation include nitrogen-containing onium cations, such as organic cations derived from aliphatic amines, alicyclic amines, and aromatic amines (e.g., a quaternary ammonium cation and the like), and organic cations having a nitrogen-containing heterocycle (i.e., organic cations derived from cyclic amines); sulfur-containing onium cations; and phosphorus-containing onium cations.

As the sulfur-containing onium cations, sulfur-containing tertiary onium cations can be exemplified, examples of which include trialkyl sulfonium cations (e.g., tri-$C_{1-10}$ alkyl sulfonium cations), such as a trimethyl sulfonium cation, a trihexyl sulfonium cation, and a dibutyl ethyl sulfonium cation.

As the phosphorus-containing onium cations, quaternary onium cations can be exemplified, examples of which include tetraalkyl phosphonium cations (e.g., tetra-$C_{1-10}$ alkyl phosphonium cations), such as a tetramethyl phosphonium cation, a tetraethyl phosphonium cation, and a tetraoctyl phosphonium cation; and alkyl(alkoxyalkyl) phosphonium cations (e.g., tri-$C_{1-10}$ alkyl($C_{1-5}$ alkoxy $C_{1-5}$ alkyl) phosphonium cations), such as a triethyl(methoxymethyl) phosphonium cation, a diethylmethyl(methoxymethyl)phosphonium cation, and a trihexyl(methoxyethyl)phosphonium cation. In an alkyl(alkoxyalkyl)phosphonium cation, the total number of alkyl groups and alkoxyalkyl groups joined to the phosphorus atom is four, and the number of alkoxyalkyl groups is preferably one or two.

Among the other cations, alkali metal cations and alkaline-earth metal cations are preferable, and a potassium ion is particularly preferable. Furthermore, as the other cation, organic cations are also preferable, and among the organic cations, an organic cation having a nitrogen-containing heterocycle is preferable.

Examples of the nitrogen-containing heterocycle skeleton of the organic cation having a nitrogen-containing heterocycle include five- to eight-membered heterocycles having one or two nitrogen atoms as constituent atoms of the ring, such as pyrrolidine, imidazoline, imidazole, pyridine, and piperidine; and five- to eight-membered heterocycles having one or two nitrogen atoms and another heteroatom (an oxygen atom, a sulfur atom, or the like) as constituent atoms of the ring, such as morpholine. The nitrogen atom which is the constituent atom of the ring may have, as a substituent, an organic group, such as an alkyl group (e.g., an alkyl group having 1 to 8 carbon atoms). Among these, an organic cation having a pyrrolidine ring is preferable from the viewpoint that it can form a molten salt with a low melting point and it is stable even at high temperatures.

An example of the organic cation having a pyrrolidine skeleton is a cation represented by the formula (2) below:

[Chem. 2]

where $R^1$ and $R^2$ are each independently an alkyl group having 1 to 8 carbon atoms. By selecting the alkyl group having 1 to 8 carbon atoms, it is possible to suppress an increase in the melting point of the electrolyte, which makes it advantageous to obtain an ionic liquid with a low viscosity. In particular, from the standpoint of obtaining an ionic liquid with a low viscosity, the number of carbon atoms of the alkyl group is preferably 1 to 3, and more preferably 1 or 2. Specifically, $R^1$ and $R^2$ may be each independently a methyl group, an ethyl group, a propyl group, an isopropyl group, or the like.

Specific examples of the organic cation having a pyrrolidine skeleton include a methylpropyl pyrrolidinium cation, an ethylpropyl pyrrolidinium cation, a methylethyl pyrrolidinium cation, a dimethyl pyrrolidinium cation, and a diethyl pyrrolidinium cation. These may be used alone or in combination of two or more. Among these, in particular, from the viewpoint of high thermal stability and electrochemical stability, a methylpropyl pyrrolidinium cation ($Py13^+$) is preferable.

As the second salt, a salt of a potassium ion and $FSI^-$ (KFSI), a salt of a potassium ion and $PFSI^-$(KPFSI), such as potassium bis(trifluoromethyl sulfonyl)imide (KTFSI); a salt of $Py13^+$ and $FSI^-$(Py13FSI), a salt of $Py13^+$ and $TFSI^-$ (Py13TFSI), or the like is preferable.

The molar ratio of the first salt to the second salt (first salt/second salt) can be appropriately selected, for example, from the range of 3/97 to 95/5, depending on the types of the first salt and the second salt, in consideration of a balance among the melting point, viscosity, and ion conductivity of the electrolyte.

In the case where the second salt is a potassium salt, the molar ratio of the first salt to the second salt (first salt/second salt) is, for example, 40/60 to 70/30, preferably 45/55 to 65/35, and more preferably 50/50 to 60/40. In the case where the second salt is a cesium salt, the molar ratio is, for example, 40/60 to 5/95, preferably 30/70 to 5/95, and more preferably 20/80 to 5/95.

In the case where a salt of $Py13^+$ is used as the second salt, such a salt has a low melting point and a low viscosity even at normal temperature, and when used in combination with the first salt, the melting point further decreases. In this case, the molar ratio of the first salt to the second salt (first salt/second salt) is, for example, 3/97 to 20/80, and preferably 5/95 to 15/85.

(Electrode Group)

A sodium molten-salt battery is used in a state in which a positive electrode, a negative electrode, a separator interposed therebetween, and an electrolyte are held in a battery case. An electrode group may be formed by stacking or winding the positive electrode and the negative electrode with the separator being interposed therebetween, and the electrode group may be placed in the battery case. In this process, by using a battery case made of a metal and electrically connecting one of the positive electrode and the negative electrode to the battery case, a portion of the battery case can be used as a first external terminal. On the other hand, the other of the positive electrode and the negative electrode is connected through a lead piece or the like to a second external terminal which is led to the outside of the battery case in a state of being insulated from the battery case.

Next, a structure of a sodium molten-salt battery according to an embodiment of the present invention will be described with reference to the drawings. However, it is to be noted that the structure of the sodium molten-salt battery of the present invention is not limited to the structure described below.

Figure 5:
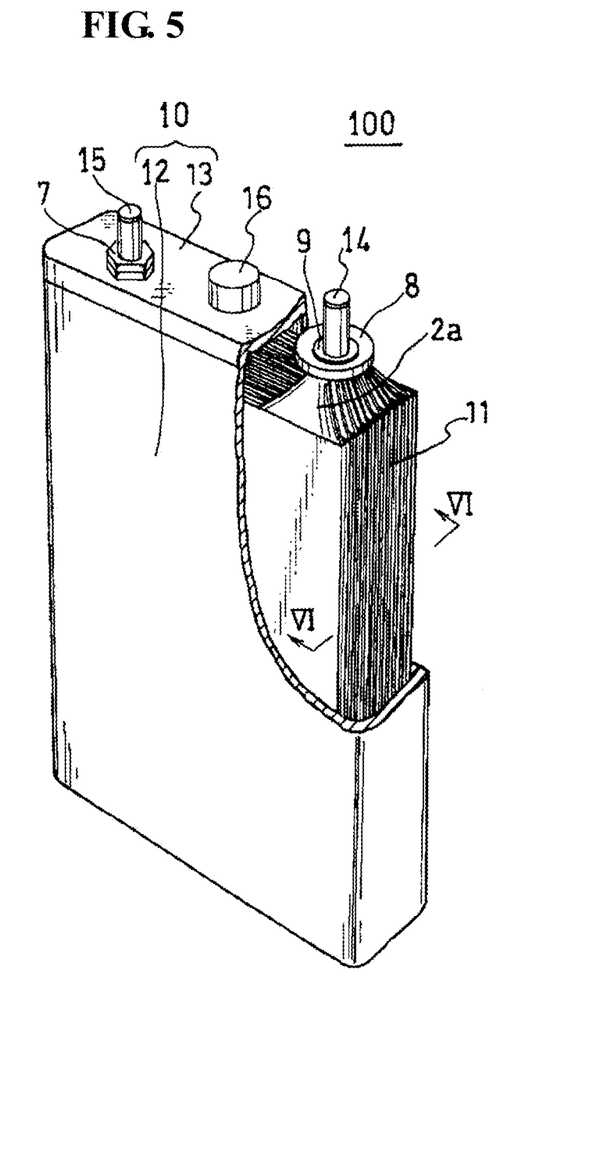
FIG. 5 is a perspective view of a molten-salt battery according to an embodiment of the present invention, in which a battery case is partially cut out.
Figure 6:
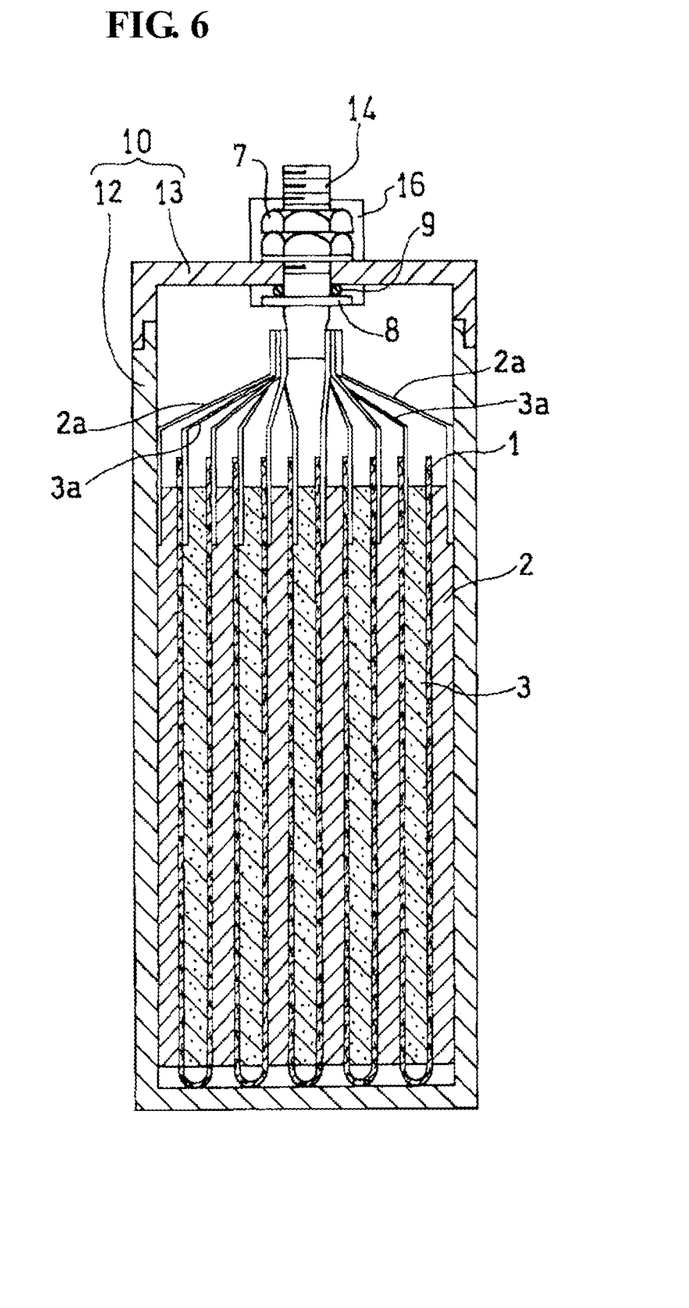
FIG. 6 is a schematic longitudinal sectional view taken along the line VI-VI of FIG. 5.

FIG. 5 is a perspective view of a sodium molten-salt battery, in which a battery case is partially cut out, and FIG. 6 is a schematic longitudinal sectional view taken along the line VI-VI of FIG. 5.

A sodium molten-salt battery 100 includes a stack-type electrode group 11, an electrolyte (not shown), and a rectangular-shaped battery case 10 made of aluminum, which contains these components. The battery case 10 includes a container body 12 having an opening on the top and a closed bottom, and a lid 13 which covers the opening on the top.

When the sodium molten-salt battery 100 is assembled, first, the electrode group 11 is formed and inserted into the container body 12 of the battery case 10. Then, a process is carried out in which a molten salt is poured into the container body 12, and spaces between the separator 1, the positive electrode 2, and the negative electrode 3 constituting the electrode group 11 are impregnated with the electrolyte. Alternatively, after the electrode group is impregnated with the molten salt, the electrode group containing the molten salt may be placed in the container body 12.

An external positive electrode terminal 14 is provided on the lid 13 at a position close to one side, the external positive electrode terminal 14 passing through the lid 13 while being electrically connected to the battery case 10. An external negative electrode terminal 15 is provided on the lid 13 at a position close to the other side, the external negative electrode terminal 15 passing through the lid 13 while being insulated from the battery case 10. A safety valve 16 is provided in the center of the lid 13 for the purpose of releasing gas generated inside when the internal pressure of the battery case 10 rises.

The stack-type electrode group 11 includes a plurality of positive electrodes 2, a plurality of negative electrodes 3, and a plurality of separators 1 interposed therebetween, each being rectangular sheet-shaped. In FIG. 6, the separator 1 is formed like a bag so as to enclose the negative electrode 3. However, the shape of the separator is not particularly limited. A plurality of positive electrodes 2 and a plurality of negative electrodes 3 are alternately arranged in the stacking direction in the electrode group 11.

A positive electrode lead piece 2a may be formed on one end of each positive electrode 2. By bundling the positive electrode lead pieces 2a of the positive electrodes 2 and connecting the bundle to the external positive electrode terminal 14 provided on the lid 13 of the battery case 10, the positive electrodes 2 are connected in parallel. Similarly, a negative electrode lead piece 3a may be formed on one end of each negative electrode 3. By bundling the negative electrode lead pieces 3a of the negative electrodes 3 and connecting the bundle to the external negative electrode terminal 15 provided on the lid 13 of the battery case 10, the negative electrodes 3 are connected in parallel. The bundles of the positive electrode lead pieces 2a and the bundle of the negative electrode lead pieces 3a are desirably arranged on the right and left sides of one end face of the electrode group 11 with a distance therebetween so as not to be in contact with each other.

Each of the external positive electrode terminal 14 and the external negative electrode terminal 15 is columnar and is provided with a thread groove at least at a portion exposed to the outside. A nut 7 is fit into the thread groove of each terminal, and by rotating the nut 7, the nut 7 is fixed to the lid 13. A flange 8 is provided on a portion of each terminal to be placed in the battery case, and the flange 8 is fixed to the inner surface of the lid 13 through a washer 9 by the rotation of the nut 7.

EXAMPLES

The present invention will be described below specifically on the basis of examples and a comparative example. However, it is to be understood that the present invention is not limited to the examples below.

Example 1

A polyamide-imide resin was used as the polymer of a binder of a negative electrode mixture. In order to confirm the performance of a negative electrode, a half cell was fabricated by the following procedure, in which metallic sodium was used as a counter electrode, and cycle characteristics were evaluated.

(1) Fabrication of Negative Electrode

A negative electrode mixture paste was prepared by dispersing 96 parts by mass of hard carbon and 4 parts by mass of the polyamide-imide resin (weight-average molecular weight: 130,000) in NMP as a dispersion medium.

The resulting paste was applied to one surface of an aluminum foil (thickness 20 µm) serving as a negative electrode current collector, dried sufficiently, and subjected to rolling. Thereby, a negative electrode with a total thickness of 65 µm, including a negative electrode mixture layer with a thickness of 45 µm, was produced. The negative electrode was cut into a rectangular shape with a size of 30×30 mm. A negative electrode lead made of aluminum was welded to the negative electrode current collector.

(2) Fabrication of Counter Electrode

A metallic sodium foil with a thickness of 700 µm was attached to one surface of an aluminum foil with a thickness of 20 µm. A counter electrode lead made of aluminum was welded to the aluminum foil.

(3) Preparation of Electrolyte

An electrolyte was prepared by mixing NaFSI and Py13FSI at a molar ratio of 1:9.

(4) Assembly of Half Cell

The negative electrode and the counter electrode were stacked with a separator being interposed therebetween to form an electrode group. As the separator, a glass fiber non-woven fabric (size: 35×35 mm, thickness: 200 µm) was used.

The electrode group was placed in a case made of aluminum, the electrolyte was poured into the case, and thereby a half cell was completed. The leads were connected to a predetermined power source.

(5) Evaluation of Cycle Characteristics

The completed half cell was held at 90° C. in a thermostatic chamber, and in a state in which the temperature was stabilized, constant-current charging and discharging were repeated at a current of 25 mA/g in the range of 0 to 1.2 V. The capacity of the half cell was measured for each charging and discharging cycle, and the ratio of the discharge capacity (capacity retention rate)(%) was calculated, in which the discharge capacity after the first cycle of charging and discharging (initial discharge capacity) was defined as 100%.

Examples 2 and 3, and Comparative Example 1

As the polymer of the binder of the negative electrode mixture, instead of the polyamide-imide resin, a Na salt of CMC (weight-average molecular weight: 100,000, Example 2), polyacrylic acid (weight-average molecular weight: 25,000, Example 3), or PVDF (Comparative Example 1) was used. The ratio, by mass, of hard carbon to the polymer was set at 97:3 (Example 2), 92:8 (Example 3), and 92:8 (Comparative Example 1). Furthermore, as the dispersion medium, instead of NMP, pure water was used in Examples 2 and 3. Except for these points, a negative electrode and a half cell were fabricated and cycle characteristics were evaluated as in Example 1.

Figure 7:
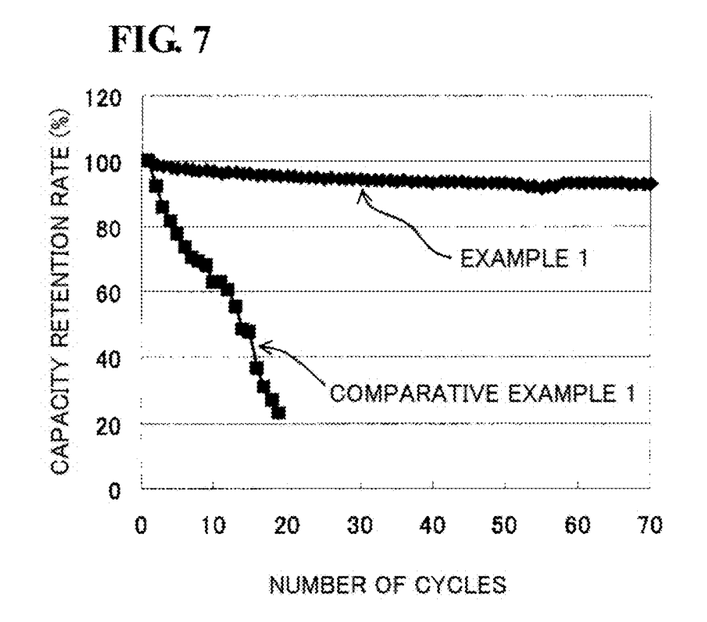
FIG. 7 is a graph showing the relationship between the capacity retention rate and the number of cycles of half cells of Example 1 and Comparative Example 1.
Figure 8:
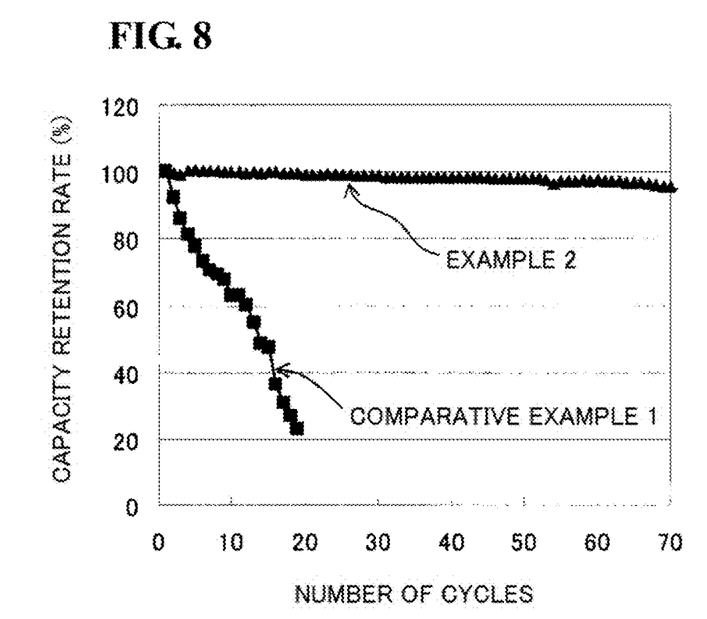
FIG. 8 is a graph showing the relationship between the capacity retention rate and the number of cycles of half cells of Example 2 and Comparative Example 1.
Figure 9:
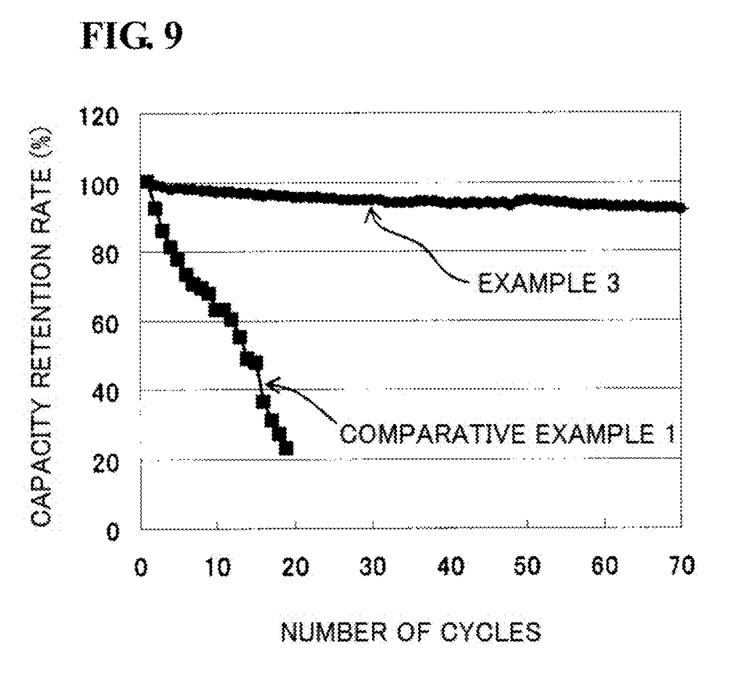
FIG. 9 is a graph showing the relationship between the capacity retention rate and the number of cycles of half cells of Example 3 and Comparative Example 1.

Regarding Examples 1 to 3, the relationship between the capacity retention rate and the number of cycles is shown in FIGS. 7 to 9, respectively. In FIGS. 7 to 9, the results of Comparative Example 1 are also shown.

As is evident from the graphs, in Comparative Example 1, the capacity retention rate rapidly decreases with repeated charging and discharging, and the capacity retention rate after 20 cycles decreases to about 20%. In contrast, in Examples, even when charging and discharging are repeated, a high capacity retention rate is maintained, and after 70 cycles, a capacity retention rate of 90% or more is maintained.

Examples 4 and 5

Regarding the polyamide-imide resin used in Example 1 as the polymer of the binder of the negative electrode mixture, in the case where the weight-average molecular weight of the polyamide-imide resin was varied (three types with a weight-average molecular weight of 40,000, 130,000, and 300,000 were used), electrode characteristics were examined (Example 4). A negative electrode and a half cell were fabricated as in Example 1 except for the use of the polyamide-imide resin with varied weight-average molecular weight, and cycle characteristics were evaluated. Furthermore, in the case where the weight-average molecular weight of the Na salt of CMC used in Example 2 was varied (four types with a weight-average molecular weight of 6,000, 100,000, 400,000, and 800,000 were used), examination was made in the same manner (Example 5). A negative electrode and a half cell were fabricated as in Example 2 except for the use of the Na salt of CMC with varied weight-average molecular weight, and cycle characteristics were evaluated.

Furthermore, in Examples 4 and 5, using a specimen in which a negative electrode mixture layer was formed on one surface of an aluminum foil, a 180° peeling test between the aluminum foil and the negative electrode mixture layer was performed in accordance with JISZ0237.

The results thereof are shown in Table I (Example 4) and Table II (Example 5).

TABLE I

| Weight-average molecular weight of polyamide-imide resin | Peel strength | Initial discharge capacity | Capacity retention rate after 50 cycles |
|---|---|---|---|
| 40,000 | 0.5 kgf/50 mm | 258 mAh/g | 81% |
| 130,000 | 1.19 kgf/50 mm | 261 mAh/g | 94% |
| 300,000 | 1.24 kgf/50 mm | 171 mAh/g | 95% |

In the case where the weight-average molecular weight of the polyamide-imide resin is varied, when the molecular weight is small, the adhesion strength determined by the 180° peeling test is low. Consequently, cycle characteristics are poor, and the capacity retention rate after 50 cycles is 81% which is lower than 94% in the case of the molecular weight of 130,000. On the other hand, when the molecular weight is large, the adhesion strength is high, but the initial discharge capacity is low. The reason for this is that the large molecular weight hinders insertion and desorption of sodium into the negative electrode active material, resulting in an increased resistance. Furthermore, when the molecular weight is large, viscosity is high and dispersibility is poor, and therefore, it is believed that uneven distribution of the polyamide-imide resin occurs.

These results show that the weight-average molecular weight of the polyamide-imide resin is preferably 50,000 to 200,000.

TABLE II

| Weight-average molecular weight of Na salt of CMC | Peel strength | Initial discharge capacity | Capacity retention rate after 50 cycles |
|---|---|---|---|
| 6,000 | — | — | — |
| 100,000 | 0.93 kgf/50 mm | 264 mAh/g | 98% |
| 400,000 | 1.16 kgf/50 mm | 261 mAh/g | 97% |
| 800,000 | 1.13 kgf/50 mm | 198 mAh/g | 97% |

When the molecular weight of the Na salt of CMC is small, viscosity is low, and fabrication of the electrode is difficult. Consequently, it is not possible to obtain an electrode with the target thickness. On the other hand, when the molecular weight is large, as in the case of the polyamide-imide resin, the initial discharge capacity is low. The reason for this is that the large molecular weight hinders insertion and desorption of sodium into the negative electrode active material, resulting in an increased resistance. Furthermore, when the molecular weight is large, viscosity is high and dispersibility is poor, and therefore, it is believed that uneven distribution of the Na salt of CMC occurs.

These results show that the weight-average molecular weight of CMC is preferably 10,000 to 500,000.

INDUSTRIAL APPLICABILITY

According to the present invention, even when charging and discharging are repeated, degradation of the electrode can be suppressed, and therefore, it is possible to provide a sodium molten-salt battery having excellent cycle characteristics. Accordingly, the sodium molten-salt battery of the present invention is useful as a large-scale power storage device for household or industrial use and a power source for electric cars and hybrid cars.

REFERENCE SIGNS LIST 100 molten-salt battery
1 separator
2 positive electrode
2a positive electrode lead piece
3 negative electrode
3a negative electrode lead piece
7 nut
8 flange
9 washer
10 battery case
11 electrode group
12 container body
13 lid
14 external positive electrode terminal
15 external negative electrode terminal
16 safety valve

The invention claimed is:

1. A sodium molten-salt battery comprising a positive electrode, a negative electrode, a separator interposed between the positive electrode and the negative electrode, and an electrolyte which has sodium ion conductivity at least at the time of being molten,
wherein the electrolyte contains at least a salt of an anion including a bis(sulfonyl)imide anion and a sodium ion;
the negative electrode includes a negative electrode current collector and a negative electrode mixture adhering to a surface of the negative electrode current collector, the negative electrode mixture including a negative electrode active material and a binder containing a polymer; and
the polymer does not contain a fluorine atom.

2. A charging and discharging method for a sodium molten-salt battery,
wherein the sodium molten-salt battery includes a positive electrode, a negative electrode, a separator interposed between the positive electrode and the negative electrode, and an electrolyte which has sodium ion conductivity at least at the time of being molten;
the electrolyte contains at least a salt of an anion including a bis(sulfonyl)imide anion and a sodium ion;
the negative electrode includes a negative electrode current collector and a negative electrode mixture adhering to a surface of the negative electrode current collector, the negative electrode mixture including a negative electrode active material and a binder containing a polymer; and
the polymer does not contain a fluorine atom,
the charging and discharging method comprising a step of charging and discharging the sodium molten-salt battery in the state of being heated in a temperature range of 40° C. to 190° C.

* * * * *